United States Patent [19]

Strattman

[11] Patent Number: 4,658,513
[45] Date of Patent: Apr. 21, 1987

[54] CONTINUOUS VAPOR PHASE PROCESSING MACHINE

[75] Inventor: Wayne P. Strattman, Boston, Mass.

[73] Assignee: Dynapert-HTC Corporation, Concord, Mass.

[21] Appl. No.: 771,697

[22] Filed: Sep. 3, 1985

[51] Int. Cl.$^4$ .............................................. F26B 15/18
[52] U.S. Cl. ........................................... 34/78; 34/73;
                                    118/61; 118/729; 118/733
[58] Field of Search ................... 34/73, 75, 76, 77, 78,
                            34/242; 68/5 E; 118/61, 729, 733, 58

[56] References Cited

U.S. PATENT DOCUMENTS 3,032,890  5/1962  Brick et al. ............................ 34/242
4,389,797  6/1983  Spigarelli et al. ....................... 34/78
4,466,202  8/1984  Merten .................................... 34/77

FOREIGN PATENT DOCUMENTS 2932400  2/1981  Fed. Rep. of Germany ........ 68/5 E

Primary Examiner—Larry I. Schwartz
Attorney, Agent, or Firm—Spencer T. Smith

[57] ABSTRACT

A continuous vapor phase processing machine of the type wherein work is selectively heated by a processing vapor in a processing vapor zone to a selected temperature for vapor phase processing. The machine has a tank containing a processing vapor, and a throat is in communication with the tank. The throat communicates with the air, and cooling coils extend along at least a portion of the throat. Openings are defined in the throat across the throat at a location substantially spaced from the outer end of the throat and a manifold communicates with these openings. Means are connected to the manifold for drawing air from the throat through the openings defined in the throat and for removing processing vapor therefrom, the flow of air being drawn into the throat through the throat exit aperture and being pulled through the opening comprising a barrier to the flow of processing vapor to the throat exit aperture.

3 Claims, 3 Drawing Figures

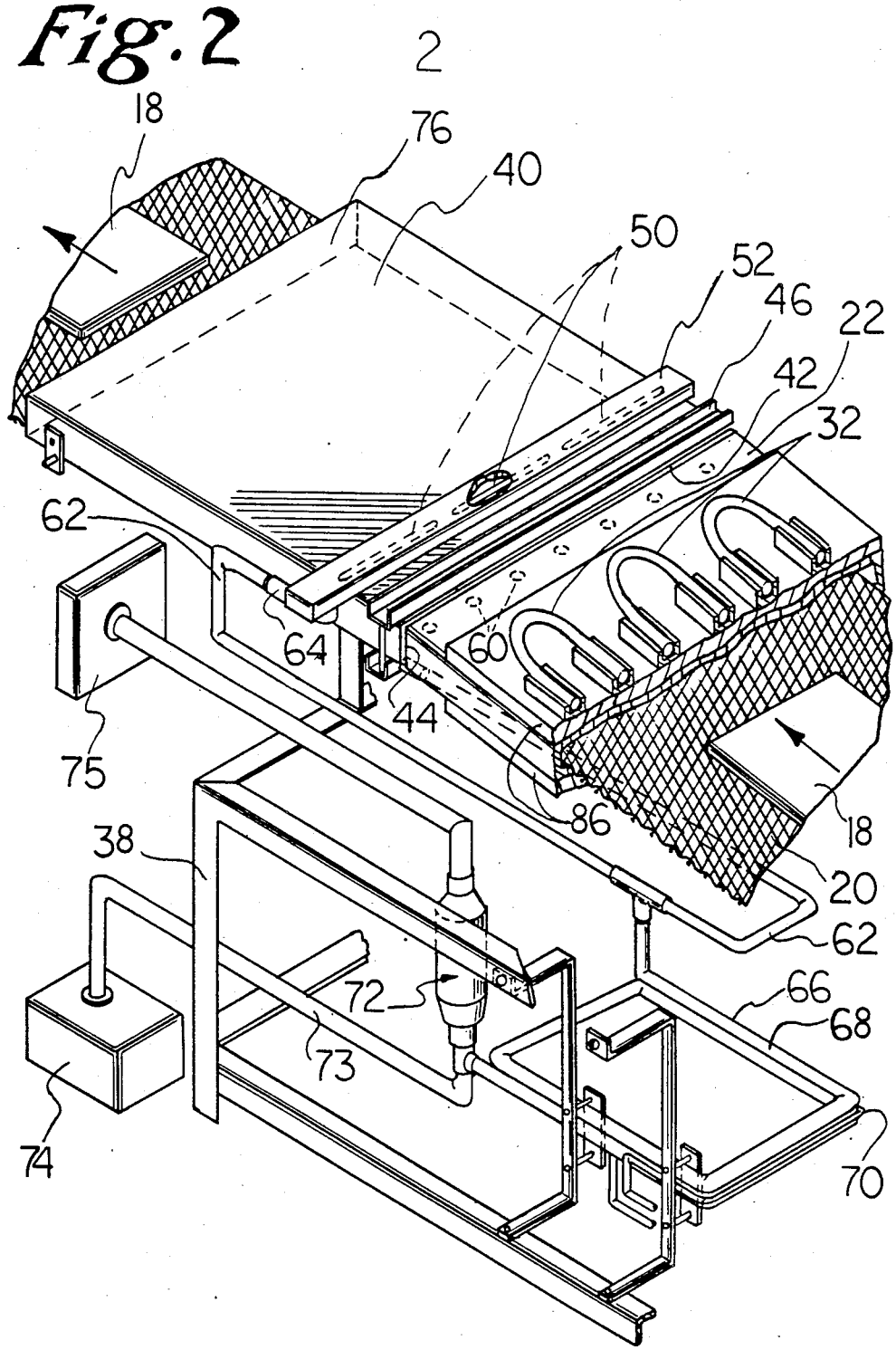

CONTINUOUS VAPOR PHASE PROCESSING MACHINE

SPECIFICATION

The present invention relates to continuous vapor phase processing systems of the type disclosed in U.S. Pat. No. 4,389,797. In such systems, product to be processed is conveyed to and from a tank, in which vapor processing occurs, via long inlet and exit throats. There is a natural tendency for the processing vapor to be dragged along the throats and to be thereby released from the system. Such losses are conventionally minimized by reducing the cross sectional area of the cooled throats and by utilizing throats of very substantial length.

It is an object of the present invention to even further reduce losses of the processing vapor.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is an oblique view of a portion of a continuous vapor processing machine made in accordance with the teachings of the present invention.

Figure 1:
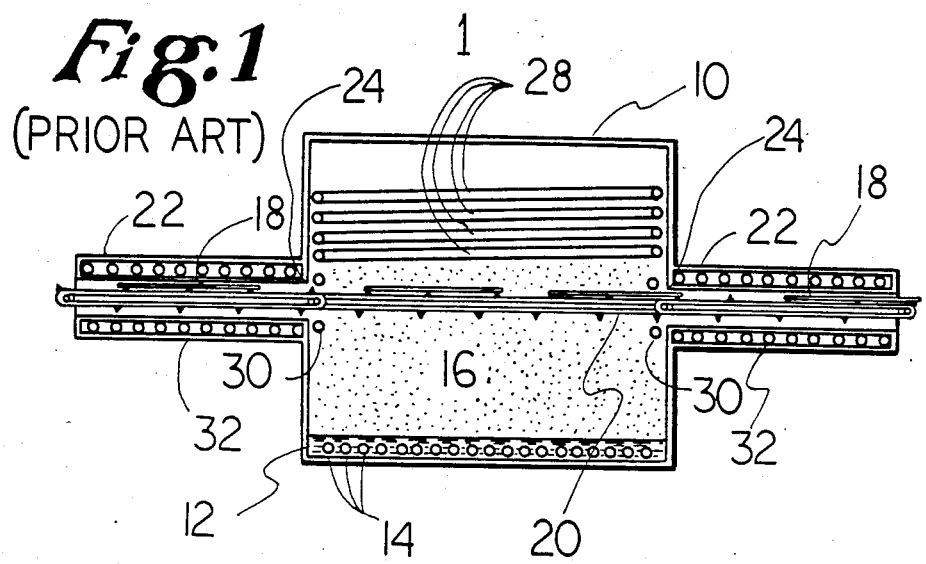
FIG. 1 is an elevational view in section of a prior art continuous vapor processing machine.

A continuous vapor processing machine may include a closed tank 10 which contains an electronic fluid 12. The electronic fluid is heated by heaters 14 to generate a processing vapor 16. Work 18 is conveyed by a conveyor system 20 from an entry location at one side of the machine through one throat 22 and into the tank 10 through a suitable opening 24, through the tank 10, wherein the work is heated to the temperature of the processing vapor 16, and through the other tank opening 24 and exit throat 22 to an exit location at the other side of the machine.

The processing vapor 16 is cooled by cooling coils 28 located near the top of the tank 10 which cause the vapor to remain in a controlled zone within the tank. A cooling coil 30 is disposed around each tank aperture 24 to minimize the amount of vapor entering the throats 22 and cooling coils 32 are provided along the length of the throats 22 to condense the processing vapor 16 that flows from the vapor zone in tank 10 into the throats 22. The cooled throats 22 have a high length to cross-sectional area ratio to thereby minimize vapor loss.

An exit throat having an alternate embodiment is shown in FIG. 2. In this embodiment, the exit throat 22 (and inlet throat) is upwardly inclined and has heat sinks 36 supporting cooling coils 32 secured to its upper and lower surfaces. A freestanding frame 38 supports a vapor recovery hood 40 which has an opening 42 adjacent the exit opening of the exit throat 22. A seal 44 extends between these two elements to prevent leakage and a bracket assembly 46 clamps the hood to the exit throat.

Figure 3:
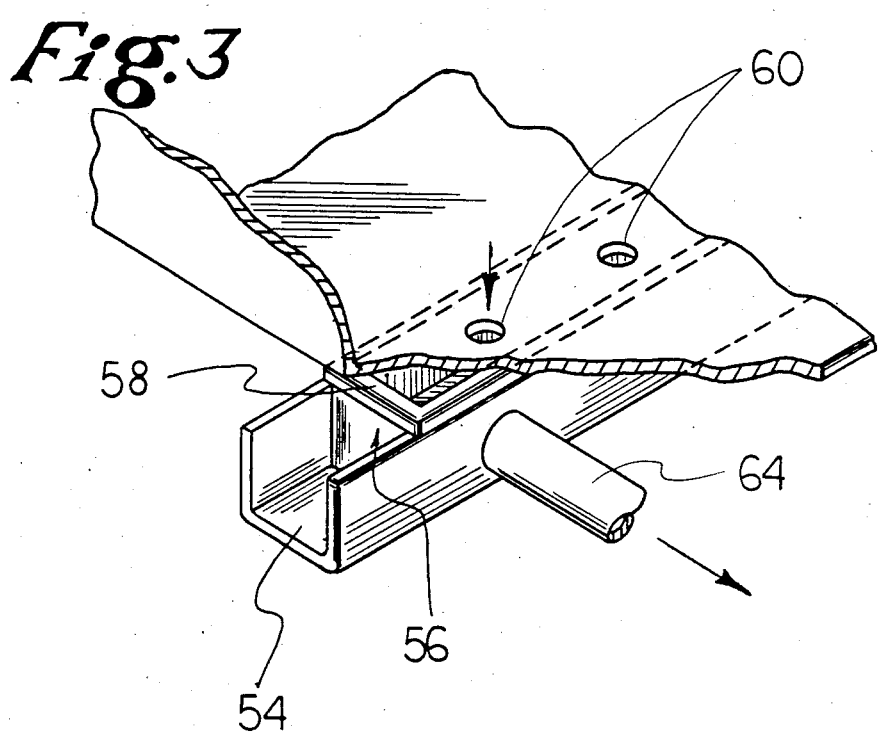
FIG. 3 is an enlarged view of a portion of the machine illustrated in FIG. 2.

Three slots 50 are defined in the top wall of the hood 40 adjacent the throat and a top manifold 52 is welded in position across the hood above these slots. The lower clamping bracket 54 of the bracket assembly 46 includes a manifold member 56 (FIG. 3) which forcefully locates a gasket 58 between itself and the lower surface of the hood. This lower manifold communicates with a number of openings 60 in the lower hood surface. Hosing 62 connects the outlets 64 of these manifolds to a condenser 66 in the form of coils 68 cooled by exteriorly mounted cooling conduits 70 for increasing the aerosol content of air drawn through the coils 68. A coalescing filter 72 separates the aerosal from the air stream and this separated liquid is delivered via a conduit 73 to a collecting tank 74.

A conventional ventilation system 75 which may draw 35-70 cfm, for example, will be connected to the exhaust of the coalescing filter to pull ambient air through the opening 76 of the hood which is in communication with the atmosphere. This air will flow in a direction opposite to the conveyor 20 toward the throat and into the manifolds 52, 56. The hood 40 has a substantial length (In the preferred embodiment, the hood 40 is approximately 18" and the exit throat is approximately 45") to enable this flow to function as a barrier to the escape of vapor to the atmosphere. Vapor in the air stream at the exit of the throat 22 is prevented from entering the hood and vapor which forms in the hood from condensate entrained either by the conveyor 20 or the work product 18 will be captured by the flow of air to the manifolds and thereby delivered to the condenser 66 and coalescing filter 72.

What is claimed is:

1. A continuous vapor phase processing machine comprising
    a vessel for containing an electronic liquid,
    heater means for heating the contained electronic liquid for generating a zone of saturated vapor,
    an aperture in said vessel,
    throat means communicating with said aperture and extending outwardly from said vessel, said throat means having an outer end communicating with the atmosphere,
    cooling means extending along said throat means outwardly from said vessel aperture,
    said throat means including opening means intermediate the outer end of said throat means and said cooling means and extending substantially transversely across said throat means at a location substantially spaced from said outer end of said throat means,
    conveyor means for conveying product through said throat means,
    manifold means communicating with said opening means and including means for drawing air through said opening means whereby air from the atmosphere will be pulled through the end of said throat means and into said manifold means to thereby establish a dynamic fluid barrier of air flowing in a direction from the outer end of the throat towards said tank to entrain electronic liquid exiting the machine through the throat and for carrying such electronic liquid through said opening means.

2. A continuous vapor phase processing machine according to claim 1 wherein said opening extends across the top and bottom surfaces of said throat means.

3. A continuous vapor phase processing machine according to claim 2 wherein said throat means comprises
    an exit throat,
    a hood having a substantial length and an inlet adjacent the end of said exit throat remote from said tank, and
    means for defining a fluid tight seal between said throat and said hood inlet,
    said opening means defined in said hood adjacent said exit throat.

* * * * *